United States Patent
Lee et al.

(10) Patent No.: US 12,427,439 B2
(45) Date of Patent: Sep. 30, 2025

(54) SYSTEM AND METHOD FOR CLEANING OF A FORCED-CIRCULATION EVAPORATIVE CRYSTALLIZER

(71) Applicant: SALTWORKS TECHNOLOGIES INC., Richmond (CA)

(72) Inventors: Justin Donghoon Lee, Richmond (CA); Benjamin Sparrow, Richmond (CA)

(73) Assignee: SALTWORKS TECHNOLOGIES INC., Richmond (CA)

( * ) Notice: Subject to any disclaimer, the term of this patent is extended or adjusted under 35 U.S.C. 154(b) by 244 days.

(21) Appl. No.: 18/253,058

(22) PCT Filed: Nov. 18, 2021

(86) PCT No.: PCT/CA2021/051630
§ 371 (c)(1),
(2) Date: May 16, 2023

(87) PCT Pub. No.: WO2022/104463
PCT Pub. Date: May 27, 2022

(65) Prior Publication Data
US 2024/0091668 A1    Mar. 21, 2024

Related U.S. Application Data

(60) Provisional application No. 63/115,209, filed on Nov. 18, 2020.

(51) Int. Cl.
*C02F 1/04* (2023.01)
*B01D 5/00* (2006.01)
(Continued)

(52) U.S. Cl.
CPC ........... *B01D 9/0031* (2013.01); *B01D 5/006* (2013.01); *B01D 9/0059* (2013.01);
(Continued)

(58) Field of Classification Search
CPC .... B01D 5/006; B01D 9/0031; B01D 9/0059; B01D 9/0063; C02F 1/041; C02F 1/5209; B08B 9/0321; F28G 9/00
See application file for complete search history.

(56) References Cited

U.S. PATENT DOCUMENTS 3,362,457 A    1/1968  Chirico
5,964,982 A *  10/1999 Roller ..................... B08B 9/027
                                                           165/95
(Continued)

FOREIGN PATENT DOCUMENTS

| CA | 2816746 A1 | 11/2012 |
| CN | 2051-45621 U | 4/2016 |
| CN | 108687066 A | 10/2018 |

OTHER PUBLICATIONS

Espacenet Machine Translation of CN 205145621 Obtained Mar. 12, 2025. (Year: 2025).*

(Continued)

*Primary Examiner* — Jonathan Miller
(74) *Attorney, Agent, or Firm* — Tarolli, Sundheim, Covell &Tummino LLP (57) ABSTRACT

A system and method for cleaning of a forced-circulation evaporative crystallizer. The crystallizer is used to produce salt solids and includes a circulation pump, a heat exchanger, a separator, and a vapor processor. Solids deposits accumulate during salt solids production within at least one of the circulation pump, heat exchanger, and separator. A solids deposits metric representative of an amount of the accumulated solids deposits is measured. The solids deposits metric is determined to deviate from a baseline by at least a cleaning threshold. Certain determinations are made based on the solids deposits metric: determining a cleaning mode and at least one of a type of cleaning solution and a duration for which at least one of the circulation pump, heat
(Continued)

exchanger, and separator is to be cleaned. At least one of the circulation pump, heat exchanger, and separator is then cleaned in accordance with those determinations.

20 Claims, 1 Drawing Sheet

(51) Int. Cl.
*B01D 9/00* (2006.01)
*B08B 9/032* (2006.01)
*C02F 1/52* (2023.01)
*F28G 9/00* (2006.01)
*C02F 103/08* (2006.01)

(52) U.S. Cl.
CPC .......... *B01D 9/0063* (2013.01); *B08B 9/0321* (2013.01); *C02F 1/041* (2013.01); *C02F 1/5209* (2013.01); *F28G 9/00* (2013.01); *B01D 2009/0086* (2013.01); *B08B 2209/032* (2013.01); *C02F 2001/5218* (2013.01); *C02F 2103/08* (2013.01); *C02F 2209/02* (2013.01); *C02F 2209/03* (2013.01); *C02F 2209/40* (2013.01); *C02F 2303/22* (2013.01)

(56) References Cited

U.S. PATENT DOCUMENTS

| | | | | |
|---|---|---|---|---|
| 6,355,145 B1 * | 3/2002 | Kresnyak | ................ | C02F 1/048 159/901 |
| 8,052,763 B2 * | 11/2011 | Gallot | ................ | B01D 1/0094 588/410 |
| 10,202,286 B2 * | 2/2019 | Ertel | ...................... | B01D 5/006 |
| 11,505,484 B2 * | 11/2022 | Sparrow | ................... | C02F 3/12 |
| 11,649,174 B2 * | 5/2023 | Schleiffarth | ............ | C02F 1/041 202/176 |
| 12,134,570 B2 * | 11/2024 | Bolton | .................... | C02F 1/048 |
| 2009/0294377 A1 * | 12/2009 | Gallot | ...................... | C02F 9/00 210/737 |
| 2015/0034564 A1 * | 2/2015 | Smtih | .................... | C02F 1/042 210/741 |
| 2015/0360971 A1 * | 12/2015 | Schleiffarth | ............ | C02F 1/041 |
| 2016/0368783 A1 * | 12/2016 | Ertel | ...................... | C02F 1/048 |
| 2021/0309550 A1 * | 10/2021 | Sparrow | .................. | C02F 9/00 |
| 2022/0098057 A1 * | 3/2022 | Bolton | ................... | C02F 1/048 |

OTHER PUBLICATIONS

European Patent Application No. 21893176.4; Supplementary European Search Report dated Aug. 30, 2024; 3 pgs.

Applicant: Saltworks Technologies Inc.; "System and Method for Cleaning of a Forced-Circulation Evaporative Crystallizer"; International Application No. PCT/CA2021/051630; PCT International Search Report dated Jan. 27, 2022; 2 pgs.

Applicant: Saltworks Technologies Inc.; "System and Method for Cleaning of a Forced-Circulation Evaporative Crystallizer"; International Application No. PCT/CA2021/051630; PCT Written Opinion of the International Searching Authority dated Jan. 27, 2022; 3 pgs.

* cited by examiner

SYSTEM AND METHOD FOR CLEANING OF A FORCED-CIRCULATION EVAPORATIVE CRYSTALLIZER

CROSS-REFERENCE TO RELATED APPLICATION

This application is a U.S. National Stage Application filed under 35 U.S.C. § 371 of PCT/CA2021/051630, filed Nov. 18, 2021, and entitled SYSTEM AND METHOD FOR CLEANING OF A FORCED-CIRCULATION EVAPORATIVE CRYSTALLIZER, which International Application claims the benefit of priority from U.S. Provisional Patent Application No. 63/115,209, filed on Nov. 18, 2020. The entire contents of each of the above-identified patent applications are incorporated herein by reference.

TECHNICAL FIELD

The present disclosure is directed at methods, systems, and techniques for cleaning of a forced-circulation evaporative crystallizer.

BACKGROUND

Saltwater such as a brine that is a byproduct of reverse osmosis desalination, and a flowback or other water produced during oil or gas production processes, generally have a high total dissolved solids (TDS) content (e.g., more than 60,000 mg/L) and consequently are prohibited from being disposed of via direct surface discharge. Rather, they can be managed by applying Zero Liquid Discharge (ZLD) or Minimum Liquid Discharge (MLD) desalination technologies, which use an evaporative crystallizer to produce salt solids that may be disposed of within landfills.

SUMMARY

According to a first aspect, there is provided a process comprising: producing salt solids and a distillate using a forced-circulation evaporative crystallizer, the crystallizer comprising: a circulation pump for circulating a slurry resulting from evaporating a saltwater using the crystallizer; a heat exchanger fluidly coupled to the circulation pump to receive and heat the slurry; a separator fluidly coupled to the heat exchanger to receive the slurry after the heat exchanger has heated the slurry and to evaporate water from the slurry to produce water vapor for the distillate and the salt solids; a vapor processor fluidly coupled to the separator for processing the water vapor, wherein solids deposits accumulate during the producing of the salt solids within at least one of the circulation pump, the heat exchanger, and the separator; measuring a solids deposits metric representative of an amount of the accumulated solids deposits; determining that the solids deposits metric deviates from a baseline by at least a cleaning threshold; based on the solids deposits metric, making determinations comprising determining a cleaning mode and determining at least one of: a type of cleaning solution; and a duration for which the at least one of the circulation pump, heat exchanger, and separator is to be cleaned; and cleaning the at least one of the circulation pump, heat exchanger, and separator in accordance with the determinations.

Processing the water vapor may comprise compressing the water vapor as a steam, and the steam may be directed to the heat exchanger to heat the slurry in the heat exchanger.

Measuring the solids deposits metric may comprise measuring a flow rate of the slurry through the circulation pump, and the solids deposits metric may be less than the baseline.

Measuring the solids deposits metric may comprise measuring a hydraulic pressure differential across the circulation pump, and the solids deposits metric may be greater than the baseline.

Measuring the solids deposits metric may comprise measuring a temperature differential across the heat exchanger, and the solids deposits metric may be less than the baseline.

Measuring the solids deposits metric may comprise measuring an amount of the distillate produced by the crystallizer, and the solids deposit metric may be less than the baseline.

The solids deposits metric may deviate from the baseline by less than 15%, and the saltwater may be selected as the cleaning solution.

The solids deposits metric may deviate from the baseline by between 15% to 20%, and the distillate produced by the forced-circulation evaporative crystallizer may be selected as the cleaning solution.

The solids deposits metric may deviate from the baseline by more than 20%, and a chemical solution comprising at least one of an acid solution, a base solution, a surfactant solution, and a chelating solution may be selected as the cleaning solution.

The cleaning mode may be determined to be cleaning the circulation pump, at least one of the saltwater and the distillate produced by the crystallizer may be selected as the cleaning solution, the circulation pump may be cleaned by flowing the cleaning solution through the circulation pump, and production of the salt solids may continue during cleaning.

The cleaning mode may be determined to be forward flushing the heat exchanger, at least one of the saltwater and the distillate produced by the crystallizer may be selected as the cleaning solution, the heat exchanger may be cleaned by flowing the cleaning solution through the heat exchanger, and production of the salt solids may continue during cleaning.

The cleaning mode may be determined to be back flushing the heat exchanger after the forward flushing of the heat exchanger fails to restore the solids deposits metric to within the cleaning threshold of the baseline, at least one of the saltwater and the distillate produced by the crystallizer may be selected as the cleaning solution, the heat exchanger may be cleaned by flowing the cleaning solution through the heat exchanger, and production of the salt solids may be paused during cleaning.

The cleaning mode may be determined to be chemical cleaning of the heat exchanger, the solids deposits metric may comprise the temperature differential across the heat exchanger and deviates from the baseline by more than 20%, the chemical solution may be selected as the cleaning solution, the heat exchanger may be cleaned by flowing the cleaning solution through the heat exchanger, and production of the salt solids may be paused during cleaning.

The cleaning mode may be determined to be chemical cleaning of a whole of the forced-circulation evaporative crystallizer, the solids deposits metric may further comprise at least one of the hydraulic pressure differential across the circulation pump, the amount of the distillate produced by the crystallizer, and the flow rate of the slurry through the circulation pump also deviating from the baseline by more than 20%, the slurry within the crystallizer may be transferred out of the crystallizer during cleaning, a chemical solution may be selected as the cleaning solution, cleaning circulation may be circulated through all of the circulation pump, heat exchanger, and separator, and production of the salt solids may be paused during cleaning.

According to another aspect, there is provided a system comprising: a forced-circulation evaporative crystallizer, the crystallizer comprising: a circulation pump for circulating a slurry resulting from evaporating a saltwater using the crystallizer; a heat exchanger fluidly coupled to the circulation pump to receive and heat the slurry; a separator fluidly coupled to the heat exchanger to receive the slurry after the heat exchanger has heated the slurry and to evaporate water from the slurry to produce water vapor and salt solids; a vapor processor fluidly coupled to the separator for processing the water vapor, wherein solids deposits accumulate during the producing of the salt solids within at least one of the circulation pump, the heat exchanger, and the separator; a cleaning sub-system comprising: a cleaning solution container for storing a chemical solution; at least one conduit fluidly coupling the circulation pump, the heat exchanger, and the separator to a source of the saltwater and to the cleaning solution container; at least one valve disposed along the at least one conduit to permit selective flowing of at least one of the saltwater and the cleaning solution to the circulation pump, the heat exchanger, and the separator; at least one sensor to measure a solids deposits metric representative of an amount of the solids deposits that have accumulated within the crystallizer; a controller communicatively coupled to the at least one sensor, the crystallizer, and the cleaning sub-system, the controller configured to: determine the solids deposits metric measured by the at least one sensor; determine that the solids deposits metric deviates from a baseline by at least a cleaning threshold; and based on the solids deposits metric, make determinations comprising determining a cleaning mode and determining at least one of: a type of cleaning solution; a duration for which the at least one of the circulation pump, heat exchanger, and separator is to be cleaned; and clean the at least one of the circulation pump, heat exchanger, and separator in accordance with the determinations.

The vapor processor may comprise a vapor compressor configured to compress the water vapor to generate a steam for the heat exchanger.

The at least one sensor may comprise a flow sensor positioned to measure a flow rate of the slurry through the circulation pump, the solids deposits metric may comprise the flow rate of the slurry through the circulation pump, and the solids deposits metric may be less than the baseline.

The at least one sensor may comprise a pair of pressure sensors positioned to measure a hydraulic pressure differential across the circulation pump, the solids deposits metric may comprise the hydraulic pressure differential across the circulation pump, and the solids deposits metric may be greater than the baseline.

The at least one sensor may comprise a pair of temperature sensors positioned to measure a temperature differential across the heat exchanger, the solids deposits metric may comprise the temperature differential across the heat exchanger, and the solids deposits metric may be less than the baseline.

The at least one sensor may comprise a flow sensor positioned to measure a flow rate of distillate produced by the crystallizer, the solids deposits metric may comprise the flow rate of the distillate produced by the crystallizer, and the solids deposit metric may be less than the baseline.

This summary does not necessarily describe the entire scope of all aspects. Other aspects, features and advantages will be apparent to those of ordinary skill in the art upon review of the following description of specific embodiments.

BRIEF DESCRIPTION OF THE DRAWINGS

In the accompanying drawings, which illustrate one or more example embodiments.

For purposes of clarity, not every component is labeled, nor is every component of each embodiment shown where illustration is not necessary to allow those of ordinary skill in the art to understand what is depicted.

DETAILED DESCRIPTION

A forced-circulation evaporative crystallizer generally comprises four basic components: a heat exchanger configured to heat a slurry resulting from evaporating a saltwater using the forced-circulation evaporative crystallizer; a separator configured to hold the heated slurry and to evaporate water from the slurry; a circulation pump to circulate the slurry between the heat exchanger and the separator; and a vapor processor to remove vapor generated from the separator. During slurry circulation and production of salt solids, solids deposits (e.g., calcium sulfate, calcium carbonate, silica, organic matter, and other salt crystals) accumulate onto surfaces of components within the forced-circulation evaporative crystallizer. For example, solids deposits may partially or fully plug the circulation pump, clog transfer lines, and scale the heat exchanger and the separator, any one or more of which disrupt reliable operation of the forced-circulation evaporative crystallizer. The various embodiments described herein provide systems and methods for cleaning of a forced-circulation evaporative crystallizer. More particularly, a forced-circulation evaporative crystallizer is used to evaporate a saltwater and produce salt solids; and a cleaning sub-system cleans solids deposits from the forced-circulation evaporative crystallizer. The cleaning of solids deposits prolongs reliable operation time and enables shorter downtime without the need to dismantle components of the forced-circulation evaporative crystallizer for cleaning.

Figure 1:
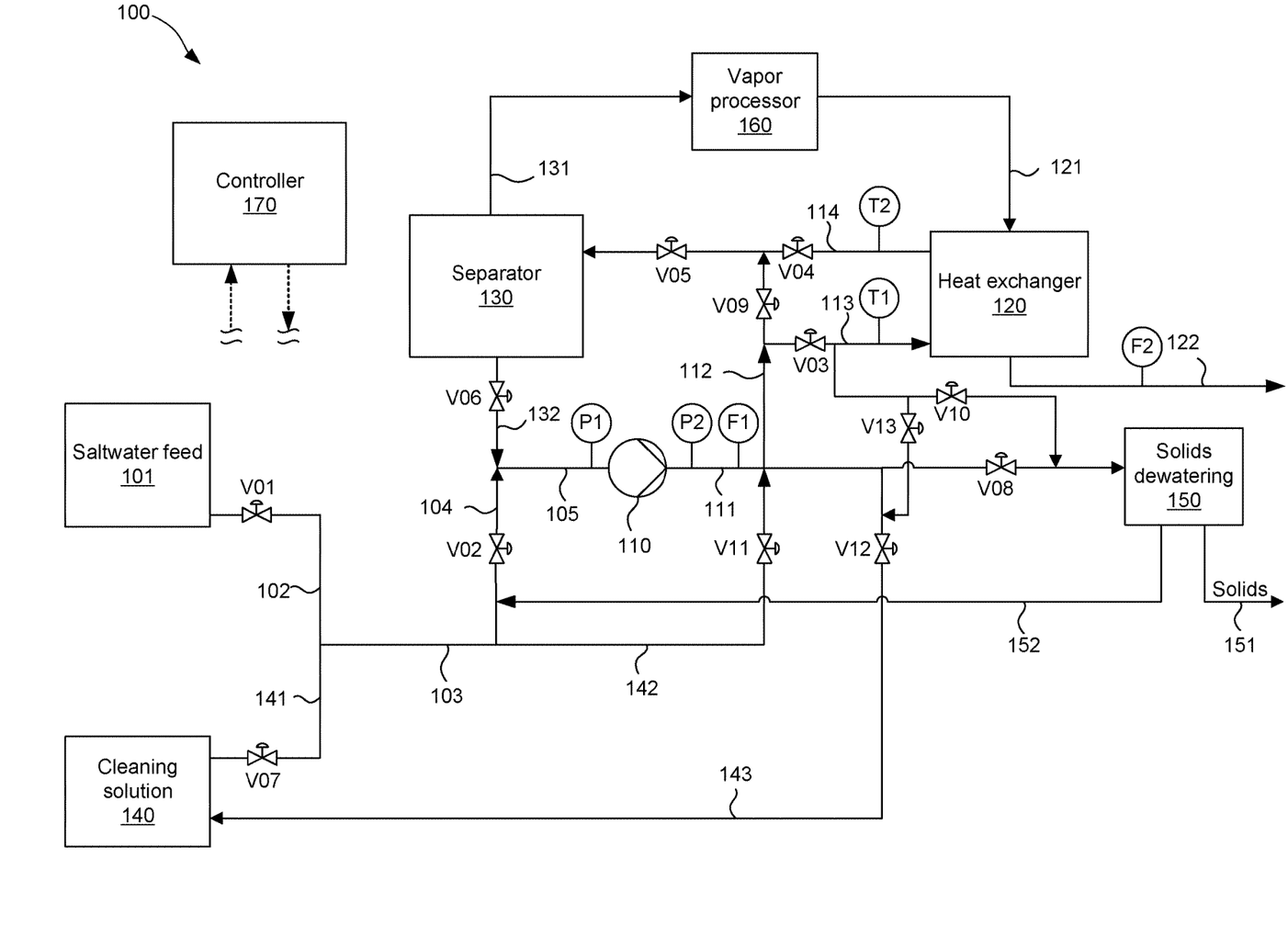
FIG. 1 is a schematic of a system for cleaning of a forced-circulation evaporative crystallizer, according to an example embodiment.

FIG. 1 shows a schematic of an example system 100 for cleaning of a forced-circulation evaporative crystallizer, according to an example embodiment. The system 100 comprises:

(a) a forced-circulation evaporative crystallizer comprising a circulation pump 110 for circulating a slurry resulting from evaporating the saltwater using the crystallizer; a heat exchanger 120 fluidly coupled to the circulation pump 110 to receive and heat the slurry; a separator 130 fluidly coupled to the heat exchanger 120 to receive the slurry and to evaporate water from the slurry to produce water vapor and salt solids; and a vapor processor 160 fluidly coupled to the separator 130 for processing the water vapor, wherein solids deposits accumulate during the producing of the salt solids within at least one of the circulation pump 110, heat exchanger 120, and separator 130;

(b) a cleaning sub-system comprising a cleaning solution container 140 for storing a cleaning solution; at least one conduit fluidly coupling the circulation pump 110, the heat exchanger 120, and the separator 130 to a source of the saltwater such as a saltwater feed container 101 and to the cleaning solution container 140; and at least one valve disposed along the at least one conduit to permit selecting flowing of at least one of the saltwater and the cleaning solution to the circulation pump 110, heat exchanger 120, and separator 130;

(c) at least one sensor to measure a solids deposits metric representative of an amount of solids deposits accumulated within the crystallizer and more particularly within at least one of the circulation pump 110, the heat exchanger 120, and the separator 130; and (d) a controller 170 configured to direct operations of the system 100, wherein the controller 170 is configured to determine the solids deposits metric using the at least one sensor; determine that the solids deposits metric deviates from a baseline by at least a cleaning threshold; and based on the solids deposits metric, make determinations comprising determining a cleaning mode and determining at least one of a type of cleaning solution and a duration for which the at least one of the circulation pump 110, heat exchanger 120, and separator 130 is to be cleaned; and to clean the at least one of the circulation pump 110, heat exchanger 120, and separator 130 in accordance with those determinations.

In FIG. 1 in particular, the at least one valve comprises control valves V02, V07, V11, V12, V13, which can selectively control the flow of the cleaning solution from the cleaning solution container 140 to at least one of the circulation pump 110, the heat exchanger 120, and the separator 130.

In at least some embodiments, the system 100 further comprises a solids dewatering unit 150 fluidly coupled to the circulation pump 110 to receive at least a portion of the slurry circulated within the forced-circulation evaporative crystallizer and to dewater the received slurry. An example dewatering unit may comprise for example a centrifuge, a filter press, and a vacuum belt filter. As used herein, two components are "fluidly coupled" if they are directly or indirectly physically connected (e.g., via piping) such that a fluid (i.e., a liquid or gas) can be transferred from one of those components to the other via that physical connection.

The vapor processor 160 may take any number of suitable forms in various example embodiments. For example, the vapor processor 160 may comprise a vapor compressor configured to compress the received water vapor and turn that water vapor into a hot steam by increasing its saturation temperature. The vapor compressor may comprise in these embodiments a positive displacement rotary blower and a centrifugal compressor. The hot steam is directed to the heat exchanger 120 and is condensed on the shell of the heat exchanger 120 as a distillate. The latent heat of condensation heats the slurry circulated within the heat exchanger 120.

Additionally or alternatively, the vapor processor 160 may comprise a vapor condenser configured to condense the received water vapor as a distillate by running a cooling water (not shown in FIG. 1) within the condenser. A steam generator (e.g., a steam drum, not shown in FIG. 1) uses at least a portion of the distillate to produce hot steam, which is directed to the heat exchanger 120 to heat the slurry circulated within the heat exchanger 120.

Additionally or alternatively, the vapor processor 160 may comprise a vapor condenser and a thermocompressor configured in parallel to receive a first portion and a second portion of the water vapor received by the vapor processor 160, respectively. The vapor condenser together with a cooling water condenses the first portion of the water vapor as a distillate. The thermocompressor mixes the second portion of the water vapor with hot steam generated by a steam generator (e.g., a steam drum, not shown in FIG. 1). The mixture of the hot steam and the second portion of the water vapor are directed to the heat exchanger 120 to heat the slurry circulated within the heat exchanger 120.

In FIG. 1, the at least one sensor used to measure the solids deposits metric that is representative of the amount of solids deposits in at least one of the circulation pump 110, the heat exchanger 120, and the separator 130 comprises pressure sensors P1 and P2, flow sensors F1 and F2, and temperature sensors T1 and T2. In at least some other embodiments, any one or more of 1) the pressure sensors P1 and P2, 2) the flow sensor F1, 3) the flow sensor F2, and 4) the temperature sensors T1 and T2 may be used as the one or more sensors that measure the solids deposits metric, which may accordingly be respectively based on one or more of pressure differential across the circulation pump 110, flow through the circulation pump 110, distillate flowing out of the heat exchanger 120, and temperature differential across the heat exchanger 120. The pressure sensors P1 and P2 measure hydraulic pressures of the circulated slurry entering and exiting the circulation pump 110, respectively. The flow sensors F1 and F2 measure a flow rate of the circulated slurry from the circulation pump 110 and an amount of distillate produced by the forced-circulation evaporative crystallizer, respectively. The temperature sensors T1 and T2 measure temperatures of the circulated slurry entering and exiting the heat exchanger 120, respectively. The solids deposits metric may be evaluated through comparing one or more of the pressure differential for the circulated slurry before and after the circulation pump 110, a flow rate for the circulated slurry within the forced-circulation evaporative crystallizer, a temperature differential across the heat exchanger 120 representative of heat exchanger efficiency, and an evaporation capacity of the forced-circulation evaporative crystallizer as represented by the distillate being discharged from the heat exchanger 120, to a baseline established during operation of the forced-circulation evaporative crystallizer under otherwise (aside from the amounts of solids deposits) identical operating conditions. If the deviation of any one or more of the sensor measurements is beyond a cleaning threshold, then cleaning of the forced-circulation evaporative crystallizer is commenced.

For example, an amount of solids deposits within the forced-circulation evaporative crystallizer may be detected through one or more of a decrease in a flow rate of the slurry according to signals from the flow sensor F1; an increase in the hydraulic pressure differential according to signals from the pressure sensors P1 and P2; a decrease in heat exchange efficiency of the heat exchanger 120 according to a temperature differential determined using signals from the temperature sensors T1 and T2; and a decrease in evaporation capacity according to the signals from the flow sensor F2. After measuring the solids deposits metric, the sensors P1, P2, F1, F2, T1, and T2 send signals representing the pressuring readings, flow readings, and temperature readings to the controller 170, which receives the signals and determines the operating modes of the forced-circulation evaporative crystallizer and the cleaning sub-system. In at least one embodiment, the controller 170 determines at least one of the cleaning solution source, and the duration that the cleaning solution is flowed through the forced-circulation evaporative crystallizer, by determining whether the solids deposits metric deviates from the baseline by at least the cleaning threshold. For example, the cleaning threshold value may be a certain percentage change in the solids deposits metric relative to baseline as represented by any one or more of the flow rate as measured by flow sensor F1, the heat exchange efficiency as measured by the temperature differential between sensors T1 and T2, the pressure differential as measured by sensors P1 and P2, and the evaporation capacity as measured by the flow rate as measured by flow sensor F2. The percentage change used as the cleaning threshold value may, for example, be less than a 15% deviation from baseline, a 15-20% deviation from baseline, and a greater than 20% deviation from baseline, with the baseline being performance of the forced-circulation evaporative crystallizer under otherwise (aside from the amounts of solids deposits) identical operating conditions. For example, "baseline" may be determined from the sensor readings obtained when operating the forced-circulation evaporative crystallizer immediately after a cleaning cycle when solids deposits have been completely flushed away, or by the crystallizer's manufacturer. The cleaning threshold may be as low as a 0% deviation in some embodiments (i.e., any measured deviation from baseline is sufficient to trigger cleaning). Alternatively, the cleaning threshold may be set above 0%. For example, deviation from 0%-5% from baseline may be insufficient to trigger cleaning, while deviation between 5%-15% may trigger one cleaning mode, deviation from 15%-20% may trigger another cleaning mode, and deviation above 20% may trigger a third cleaning mode, as alluded to above.

In at least another embodiment, the controller 170 determines at least one of the cleaning solution source and the duration that the cleaning solution is flowed through the forced-circulation evaporative crystallizer, based on historical settings for those values used during previous cleaning operations that were empirically found to restore performance of the forced-circulation evaporative crystallizer. For example, the controller 170 may select the duration from a lookup table in which empirically derived cleaning durations are indexed relative to percentage deviation from baseline.

The controller 170 may be implemented using one or more computer systems. A suitable controller 170 may comprise for example an automated unit comprising one or more of an integrated circuit (IC), a monolithic integrated circuit (MIC), an application specific integrated circuit (ASIC), a field programmable gate array (FPGA), a programmable logic controller (PLC), a system-on-a-chip (SoC), and a processor and a non-transitory computer readable medium communicatively coupled to the processor and having stored thereon computer program code that is executable by the processor. Examples of computer readable media that are non-transitory include disc-based media such as CD-ROMs and DVDs, magnetic media such as hard drives and other forms of magnetic disk storage, semiconductor based media such as flash media, random access memory (including DRAM and SRAM), and read only memory.

According to at least some embodiments and with reference to FIG. 1, a process for cleaning of a forced-circulation evaporative crystallizer comprises:
(a) producing salt solids using the forced-circulation evaporative crystallizer, the forced-circulation evaporative crystallizer comprising a circulation pump 110 for circulating a slurry resulting from evaporating the saltwater using the crystallizer; a heat exchanger 120 fluidly coupled to the circulation pump 110 to receive and heat the slurry; a separator 130 fluidly coupled to the heat exchanger 120 to receive the slurry and to evaporate water from the slurry to produce water vapor and salt solids; and a vapor processor 160 fluidly coupled to the separator 130 for processing the water vapor, wherein solids deposits accumulate during the producing of the salt solids within at least one of the circulation pump 110, heat exchanger 120, and separator 130;
(b) measuring a solids deposits metric representative of an amount of the accumulated solids deposits;
(c) determining that the solids deposits metric deviates from a baseline by at least the cleaning threshold;
(d) based on the solids deposits metric, making determinations comprising determining a cleaning mode and determining at least one of: a type of cleaning solution, and a duration for which the at least one of the circulation pump 110, heat exchanger 120, and separator 130 is to be cleaned; and
(e) cleaning the at least one of the circulation pump 110, heat exchanger 120, and separator 130 in accordance with those determinations.

During the cleaning operation, the controller 170 may direct a cleaning solution from the cleaning solution container 140 along the fluid path comprising at least one of control valves V02, V07, V11, V12, V13 for permitting selective control of the flow of the cleaning solution from the cleaning solution container 140 to at least one of the circulation pump 110, the heat exchanger 120, and the separator 130.

In operation, the saltwater to be treated by the system 100 is directed from the saltwater feed container 101 and via control valves V01, V02, and conduits 102, 103, 104, 105 into the circulation pump 110 by means of a sucking force from the circulation pump 110. The saltwater may be, for example, a brine that is a byproduct of reverse osmosis desalination, or a flowback or other water produced during oil or gas production processes. The saltwater may be pretreated by pretreatment processes (not shown in FIG. 1) to remove at least some suspended solids, greases, and oils from the saltwater. The pretreatment may comprise applying one or more of media filtration, microfiltration, ultrafiltration, coagulation, flocculation, gas flotation, clarification, and sedimentation. The saltwater may be fed to the circulation pump 110 periodically (e.g., by treating saltwater in batches) or continuously, depending on the solids content of the slurry circulated using the forced-circulation evaporative crystallizer. The circulation pump 110 pressurizes the saltwater through conduits 111, 112, and 113, and control valve V03 into the heat exchanger 120. Hot steam is introduced via conduit 121 to the shell of the heat exchanger 120 to heat the saltwater within the heat exchanger 120. The heat exchanger 120 may comprise, for example, one or more heat transfer tubes manufactured from a heat-conductive material (e.g., titanium). The hot steam is condensed as a distillate, which is discharged via conduit 122 out of the system 100. The latent heat of condensation heats the saltwater. A control valve V05 and the circulation pump 110 work cooperatively to maintain a hydrostatic pressure for the heated saltwater within the heat exchanger 120, which ensures minimum water evaporation from the heated saltwater within the heat exchanger 120. The pressurized and heated saltwater is then pumped into in the separator 130 to evaporate at least a portion of the water therefrom, producing a water vapor and salt solids. The produced salt solids and the residual saltwater becomes the slurry within the separator 130.

The slurry generated in the separator 130 is directed via control valve V06 and conduits 132, 105 to the circulation pump 110. The slurry may be mixed with the saltwater from the saltwater feed container 101 before entering the circulation pump 110. The circulation pump 110 circulates at least some of the slurry through the heat exchanger 120 and into the separator 130 for further water evaporation and production of salt solids. The portion of the slurry not circulated through the heat exchanger 120 and the separator 130 may be directed via conduit 111 and control valve V08 from the circulation pump 110 to the solids dewatering unit 150 based on the salt solids content of the circulated slurry. For example, when the slurry density of the circulated slurry increases to 1.80 g/mL, about 10 vol % of the circulated slurry is discharged to the solids dewatering unit 150. The solids dewatering unit 150 dewaters the received slurry. The salt solids from the dewatering are discharged via conduit 151 out of the system 100. The brine from the dewatering may be circulated back via conduits 152, 104 and control valve V02 and be mixed with the slurry entering the circulation pump 110 for further water evaporation and production of salt solids.

At least a portion of the water vapor generated from the separator 130 may be directed via conduit 131 to the vapor processor 160. Hot steam is directed to the heat exchanger 120 from the vapor processor 160 to heat the slurry circulated within the heat exchanger 120. In at least one embodiment, the hot steam is generated through compressing at least a portion of the water vapor received by the vapor processor 160 using a vapor compressor within the vapor processor 160. The hot steam may additionally or alternatively be generated through boiling at least a portion of distillate produced by condensing the water vapor received by the vapor processor 160. The condensing and the boiling are performed through a vapor condenser and a steam generator within the vapor processor 160, respectively. The hot steam may additionally or alternatively be generated by mixing at least a first portion of the water vapor received by the vapor processor 160 with hot steam generated using a thermocompressor within the vapor processor 160. A second portion of the water vapor received by the vapor processor 160 is condensed by a vapor condenser as a distillate, a portion of which is boiled by a steam generator as the hot steam used for the mixing.

According to at least some embodiments, the controller 170 directs the system 100 to operate in a saltwater-feeding mode for producing salt solids, and any one of several cleaning modes for cleaning solids deposits within one or more of the circulation pump 110, the heat exchanger 120, and the separator 130. In the saltwater-feeding mode, control valves V01, V02, V03, V04, V05 and V06 are in an open position, and control valves V07, V09, V10, V11, V12 and V13 are in a closed position. Saltwater from the saltwater container 101 is fed to the system 100 periodically or continuously, depending on the solids content of the slurry circulated within the forced-circulation evaporative crystallizer. As water evaporation and production of salt solids take place, solids deposits gradually build up within one or more of the circulation pump 110, the heat exchanger 120, and the separator 130. At least one of the sensors P1, P2, F1, F2, T1, and T2 measures the solids deposits metric and sends the resulting measurement signals to the controller 170. The controller 170 evaluates the signals, for example, by comparing the solids deposits metric with a baseline to determine whether the measured metric deviates from the baseline by more than a cleaning threshold. The cleaning threshold may be for example, at least one of the flow rates as measured by F1 or F2, the heat exchange efficiency as measured by the temperature differential between sensors T1 and T2, and the pressure differential as measured between sensors P1 and P2 deviating from the baseline by less than 15%, deviating from the baseline by between 15-20%, and deviating from the baseline by more than 20%, wherein the baseline may be determined based on sensor readings corresponding to performance of the forced-circulation evaporative crystallizer under otherwise (aside from the amounts of solids deposits) identical operating conditions as when the solids deposits metric is measured. When the solids deposits metric is outside of the preset threshold range, the controller 170 directs the system 100 to be operated in one of the cleaning modes.

In at least some embodiments, in any one of the cleaning modes the controller 170 uses the solids deposits metric to determine the cleaning solution source. The cleaning solution may be sourced from one or more of the saltwater, the distillate resulted from condensing the water vapor using the forced-circulation evaporative crystallizer as described above, and a chemical cleaning solution comprising at least one of an acid solution, a base solution, and a chelating solution (e.g., one of ethyl enediaminetetraacetic acid solution and diethylenetriaminepentaacetic acid solution). For example, the controller 170 may select the saltwater as the cleaning solution source when the solids deposits metric deviates by less than 15% compared to baseline, regardless of whether the metric is determined using the pressure sensors P1 and P2, either of the flow sensors F1 and F2, or the temperature sensors T1 and T2. Similarly, the controller 170 may select the distillate as the cleaning solution source when deviation of the solids deposits metric regardless of which sensors the metric is based on is between 15-20%; and the controller 170 may select the chemical cleaning solution as the cleaning solution source when deviation of the solids deposits metric regardless of which sensors the metric is based on is above 20%.

One of the cleaning modes may be cleaning the circulation pump 110. In this mode, the controller 170 may clean the circulation pump 110 by setting control valves V02, V03, V04, V05, V06 and V07 in an open position, and control valves V01, V08, V09, V10, V11, V12 and V13 in a closed position. When the solids deposits metric based on the readings from the flow sensor F1 (i.e., a decrease in flow rate of the circulated slurry as measured by the flow sensor F1) or the pressure differential as determined by the pressure sensors P1 and P2 (i.e., an increase in the pressure differential measured by sensors P1 and P2) deviates from baseline by more than the cleaning threshold, at least one of the saltwater and the distillate is selected as the cleaning solution and directed from the cleaning solution container 140 via control valves V07, V02 and conduits 141, 103, 104 to the circulation pump 110. The cleaning solution flushes at least some of the solids deposits within the circulation pump 110 down to the heat exchanger 120. The flushed solids deposits together with the used cleaning solution is mixed with the slurry circulated within the forced-circulation evaporative crystallizer. When the system 100 is in this cleaning mode and the circulation pump 110 is being cleaned, water evaporation and production of salt solids from the slurry within the forced-circulation evaporative crystallizer may continue, and the forced-circulation evaporation crystallizer has no downtime.

Another cleaning mode may be forward flushing the heat exchanger 120. The controller 170 determines this to be the cleaning mode when the solids deposits metric as determined by the temperature differential across the heat exchanger 120 as measured by the temperature sensors T1 and T2 deviating from baseline by more than the cleaning threshold; this corresponds to a decrease in heat exchange efficiency for the heat exchanger 120. In this cleaning mode, the controller 170 ensures control valves V03, V04, V05, V06, V07 and V11 are in the open position, and control valves V01, V02, V08, V09, V10, V12 and V13 are in the closed position. At least one of the saltwater and the distillate is selected as the cleaning solution and directed as the cleaning solution from the cleaning solution container 140 via control valves V07, V11, V03 and conduits 141, 103, 142, 112, 113 to the heat exchanger 120. The cleaning solution flushes at least some of the solids deposits that have built up within the heat exchanger 120 down to the separator 130. The flushed solids deposits together with the used cleaning solution is mixed with the slurry circulated within the forced-circulation evaporative crystallizer. When forward flushing the heat exchanger 120, water evaporation and production of salt solids from the slurry within the forced-circulation evaporative crystallizer may continue, and the forced-circulation evaporation crystallizer has no downtime.

Another cleaning mode may be back flushing the heat exchanger 120. The controller 170 determines this to be the cleaning mode after the forward flushing mode fails to restore the performance of the heat exchanger 120 to baseline, or at least such that deviation from baseline is less than the cleaning threshold. In this cleaning mode, the controller 170 ensures control valves V04, V07, V09, V10 and V11 are in the open position, and control valves V01, V02, V03, V05, V06, V08, V12 and V13 are in the closed position. At least one of the saltwater and the distillate is selected as the cleaning solution and directed from the cleaning solution container 140 via control valves V07, V11, V09, V04 and conduits 141, 103, 142, 112, 114 to the heat exchanger 120. The cleaning solution flushes at least some of the solids deposits that have built up inside the heat exchanger 120 down to the solids dewatering unit 150. The dewatering unit 150 dewaters the flushed solids deposits, which are discharged via conduit 151 out of the system 100. When back flushing the heat exchanger 120, water evaporation and production of salt solids from the slurry within the forced-circulation evaporative crystallizer are paused.

Another the cleaning mode may be chemically cleaning the heat exchanger 120. The controller 170 determines this to be the cleaning mode when the solids deposits metric as determined by the temperature differential across the heat exchanger 120 as measured by the temperature sensors T1 and T2 deviating from baseline by more than a cleaning threshold of, for example, 20%; this corresponds to a decrease in heat exchange efficiency for the heat exchanger 120. In this cleaning mode, the controller 170 ensures control valves V04, V07, V09, V11 and V13 are in the open position, and control valves V01, V02, V03, V05, V06, V08, V10, and V12 are in the closed position. A chemical solution is selected as the cleaning solution and is directed from the cleaning solution container 140 via control valves V07, V11, V09, V04 and conduits 141, 103, 142, 112, 114 to the heat exchanger 120. The cleaning solution cleans at least some of the solids deposits that have built up within the heat exchanger 120, and the used chemical cleaning solution exiting from the heat exchanger 120 is recycled via control valves V13 and V12 and conduit 143 back to the cleaning solution container 140. When the heat exchanger 120 is being chemically cleaned, water evaporation and production of salt solids from the slurry within the forced-circulation evaporative crystallizer are paused.

Another cleaning mode may be chemically cleaning the whole forced-circulation evaporative crystallizer. The controller 170 determines this to be the cleaning mode when the solids deposits metrics as determined using both the temperature sensors T1 and T2 and any one or more of the sensors P1, P2, F1, and F2, vary by more than 20% relative to its baseline. Prior to initiating this chemical cleaning for the entire crystallizer, the slurry circulated within the forced-circulation evaporative crystallizer may be transferred to a storage tank (not shown in FIG. 1) for temporary storage and for subsequent reintroduction into the forced-circulation evaporative crystallizer after the cleaning process is complete. The controller 170 ensures that control valves V03, V04, V05, and V06 are in the open position, and that control valves V01, V08, V09, V10, V11, and V13 are in the closed position; control valves V02 and V07 are in the open position only when the chemical cleaning solution is flowing into the forced-circulation evaporative crystallizer and are put into the closed position after the flowing stops; and control valve V12 is only in the open position when the used chemical cleaning solution is being discharged and is in the closed position when the chemical cleaning solution is being pumped into and is circulating throughout the crystallizer. A chemical solution is selected as a cleaning solution source and is directed from the cleaning solution container 140 via control valves V07, V02 and conduits 141, 103, 104 into the forced-circulation evaporative crystallizer. The chemical cleaning solution is circulated within the forced-circulation evaporative crystallizer to clean at least some of the solids deposits that have built up within the forced-circulation evaporative crystallizer. After cleaning, the chemical cleaning solution is discharged out of the forced-circulation evaporative crystallizer via control valve 12 and recycled back via conduit 142 to the cleaning solution container 140. During chemical cleaning of the whole forced-circulation evaporative crystallizer, water evaporation and production of salt solids from the slurry within the forced-circulation evaporative crystallizer are paused.

The terminology used herein is for the purpose of describing particular embodiments only and is not intended to be limiting. Accordingly, as used herein, the singular forms "a", "an", and "the" are intended to include the plural forms as well, unless the context clearly indicates otherwise. It will be further understood that the terms "comprises" and "comprising", when used in this specification, specify the presence of one or more stated features, integers, steps, operations, elements, and components, but do not preclude the presence or addition of one or more other features, integers, steps, operations, elements, components, and groups. Directional terms such as "top", "bottom", "upwards", "downwards", "vertically", and "laterally" are used in the following description for the purpose of providing relative reference only, and are not intended to suggest any limitations on how any article is to be positioned during use, or to be mounted in an assembly or relative to an environment. Additionally, the term "couple" and variants of it such as "coupled", "couples", and "coupling" as used in this description are intended to include indirect and direct connections unless otherwise indicated. For example, if a first device is coupled to a second device, that coupling may be through a direct connection or through an indirect connection via other devices and connections. The term "and/or" as used herein in conjunction with a list means any one or more items from that list. For example, "A, B, and/or C" means "any one or more of A, B, and C".

It is contemplated that any part of any aspect or embodiment discussed in this specification can be implemented or combined with any part of any other aspect or embodiment discussed in this specification.

One or more example embodiments have been described by way of illustration only. This description is presented for purposes of illustration and description but is not intended to be exhaustive or limited to the form disclosed. It will be apparent to persons skilled in the art that a number of variations and modifications can be made without departing from the scope of the claims.

The invention claimed is:

1. A process comprising:
   a. producing salt solids and a distillate using a forced-circulation evaporative crystallizer, the crystallizer comprising:
      i. a circulation pump for circulating a slurry resulting from evaporating a saltwater using the crystallizer;
      ii. a heat exchanger fluidly coupled to the circulation pump to receive and heat the slurry;
      iii. a separator fluidly coupled to the heat exchanger to receive the slurry after the heat exchanger has heated the slurry and to evaporate water from the slurry to produce water vapor for the distillate and the salt solids;
      iv. a vapor processor fluidly coupled to the separator for processing the water vapor, wherein solids deposits accumulate during the producing of the salt solids within at least one of the circulation pump, the heat exchanger, or the separator;
   b. measuring a solids deposits metric representative of an amount of the accumulated solids deposits;
   c. determining that the solids deposits metric deviates from a baseline by at least a cleaning threshold;
   d. based on the solids deposits metric, making determinations comprising determining a cleaning mode and determining at least one of:
      i. a type of cleaning solution; or
      ii. a duration for which the at least one of the circulation pump, the heat exchanger, or the separator is to be cleaned; and
   e. cleaning the at least one of the circulation pump, the heat exchanger, or the separator in accordance with the determinations.

2. The process of claim 1, wherein processing the water vapor comprises compressing the water vapor as a steam, and wherein the steam is directed to the heat exchanger to heat the slurry in the heat exchanger.

3. The process of claim 1, wherein measuring the solids deposits metric comprises measuring a flow rate of the slurry through the circulation pump, and wherein the solids deposits metric is less than the baseline.

4. The process of claim 1, wherein measuring the solids deposits metric comprises measuring a hydraulic pressure differential across the circulation pump, and wherein the solids deposits metric is greater than the baseline.

5. The process of claim 1, wherein measuring the solids deposits metric comprises measuring a temperature differential across the heat exchanger, and wherein the solids deposits metric is less than the baseline.

6. The process of claim 1, wherein measuring the solids deposits metric comprises measuring an amount of the distillate produced by the crystallizer, and wherein the solids deposit metric is less than the baseline.

7. The process of claim 3, wherein the solids deposits metric deviates from the baseline by less than 15%, and wherein the saltwater is selected as the cleaning solution.

8. The process of claim 3, wherein the solids deposits metric deviates from the baseline by between 15% to 20%, and wherein the distillate produced by the forced-circulation evaporative crystallizer is selected as the cleaning solution.

9. The process of claim 3, wherein the solids deposits metric deviates from the baseline by more than 20%, and wherein a chemical solution comprising at least one of an acid solution, a base solution, a surfactant solution, or a chelating solution is selected as the cleaning solution.

10. The process of claim 3, wherein the cleaning mode is determined to be cleaning the circulation pump, wherein at least one of the saltwater or the distillate produced by the crystallizer is selected as the cleaning solution, wherein the circulation pump is cleaned by flowing the cleaning solution through the circulation pump, and wherein production of the salt solids continues during cleaning.

11. The process of claim 5, wherein the cleaning mode is determined to be forward flushing the heat exchanger, wherein at least one of the saltwater or a distillate produced by the crystallizer is selected as the cleaning solution, wherein the heat exchanger is cleaned by flowing the cleaning solution through the heat exchanger, and wherein production of the salt solids continues during cleaning.

12. The process of claim 11, wherein the cleaning mode is determined to be back flushing the heat exchanger after the forward flushing of the heat exchanger fails to restore the solids deposits metric to within the cleaning threshold of the baseline, wherein at least one of the saltwater or a distillate produced by the crystallizer is selected as the cleaning solution, wherein the heat exchanger is cleaned by flowing the cleaning solution through the heat exchanger, and wherein production of the salt solids is paused during cleaning.

13. The process of claim 9, wherein the cleaning mode is determined to be chemical cleaning of the heat exchanger, wherein the solids deposits metric comprises the temperature differential across the heat exchanger and deviates from the baseline by more than 20%, wherein the chemical solution is selected as the cleaning solution, wherein the heat exchanger is cleaned by flowing the cleaning solution through the heat exchanger, and wherein production of the salt solids is paused during cleaning.

14. The process of claim 13, wherein the cleaning mode is determined to be chemical cleaning of a whole of the forced-circulation evaporative crystallizer, wherein the solids deposits metric further comprises at least one of the hydraulic pressure differential across the circulation pump, the amount of the distillate produced by the crystallizer, or the flow rate of the slurry through the circulation pump also deviating from the baseline by more than 20%, wherein the slurry within the crystallizer is transferred out of the crystallizer during cleaning, wherein a chemical solution is selected as the cleaning solution, wherein cleaning circulation is circulated through all of the circulation pump, heat exchanger, and separator, and wherein production of the salt solids is paused during cleaning.

15. A system comprising:
   a. a forced-circulation evaporative crystallizer, the crystallizer comprising:
      i. a circulation pump for circulating a slurry resulting from evaporating a saltwater using the crystallizer;
      ii. a heat exchanger fluidly coupled to the circulation pump to receive and heat the slurry;
      iii. a separator fluidly coupled to the heat exchanger to receive the slurry after the heat exchanger has heated the slurry and to evaporate water from the slurry to produce water vapor and salt solids;
      iv. a vapor processor fluidly coupled to the separator for processing the water vapor, wherein solids deposits accumulate during the producing of the salt solids within at least one of the circulation pump, the heat exchanger, or the separator;

b. a cleaning sub-system comprising:
  i. a cleaning solution container for storing a chemical solution;
  ii. at least one conduit fluidly coupling the circulation pump, the heat exchanger, and the separator to a source of the saltwater and to the cleaning solution container;
  iii. at least one valve disposed along the at least one conduit to permit selective flowing of at least one of the saltwater or the cleaning solution to the circulation pump, the heat exchanger, and the separator;
c. at least one sensor to measure a solids deposits metric representative of an amount of the solids deposits that have accumulated within the crystallizer;
d. a controller communicatively coupled to the at least one sensor, the crystallizer, and the cleaning sub-system, the controller configured to:
  i. determine the solids deposits metric measured by the at least one sensor;
  ii. determine that the solids deposits metric deviates from a baseline by at least a cleaning threshold; and
  iii. based on the solids deposits metric, make determinations comprising determining a cleaning mode and determining at least one of:
    1. a type of cleaning solution; or
    2. a duration for which the at least one of the circulation pump, the heat exchanger, or the separator is to be cleaned; and
  iv. clean the at least one of the circulation pump, the heat exchanger, or the separator in accordance with the determinations.

16. The system of claim 15, wherein the vapor processor comprises a vapor compressor configured to compress the water vapor to generate a steam for the heat exchanger.

17. The system of claim 15, wherein the at least one sensor comprises a flow sensor positioned to measure a flow rate of the slurry through the circulation pump, wherein the solids deposits metric comprises the flow rate of the slurry through the circulation pump, and wherein the solids deposits metric is less than the baseline.

18. The system of claim 15, wherein the at least one sensor comprises a pair of pressure sensors positioned to measure a hydraulic pressure differential across the circulation pump, wherein the solids deposits metric comprises the hydraulic pressure differential across the circulation pump, and wherein the solids deposits metric is greater than the baseline.

19. The system of claim 15, wherein the at least one sensor comprises a pair of temperature sensors positioned to measure a temperature differential across the heat exchanger, wherein the solids deposits metric comprises the temperature differential across the heat exchanger, and wherein the solids deposits metric is less than the baseline.

20. The system of claim 15, wherein the at least one sensor comprises a flow sensor positioned to measure a flow rate of distillate produced by the crystallizer, wherein the solids deposits metric comprises the flow rate of the distillate produced by the crystallizer, and wherein the solids deposit metric is less than the baseline.

* * * * *